2,972,596

POLY-α-OLEFIN COMPOSITIONS CONTAINING ZINC DIALKYLTHIOCARBAMATES AND 4-ALKOXY-2-HYDROXY BENZOPHENONES

Gordon C. Newland and John W. Tamblyn, Kingsport, Tenn., assignors to Eastman Kodak Company, Rochester, N.Y., a corporation of New Jersey No Drawing. Filed Nov. 28, 1958, Ser. No. 776,696

8 Claims. (Cl. 260—45.75)

This invention relates to the stabilization of poly-α-olefin compositions. Preferred embodiments of the invention relate to the stabilization of polyethylene and polypropylene compositions against deterioration resulting from exposure to sunlight or ultraviolet light with a novel synergistic combination of stabilizers.

Poly-α-olefins such as polyethylene, polypropylene and the like are subject to photo-oxidation when exposed to sunlight. This oxidation is characterized in its earlier stages by the breaking of the polymer chain and the formation of carbonyl groups in the polymer's molecule. As the oxidation continues, the polymer cracks and loses tensile strength to the point of mechanical failure. A number of so-called ultraviolet inhibitors are known which inhibit the photo-degradation of many polymers, resins or plastics. However, many effective stabilizers for halogen-containing polymers, for example, such as polyvinyl chloride, polyvinylidene chloride and the like are not effective stabilizers in poly-α-olefins as stabilizers in halogen-containing polymers function essentially as hydrogen halide scavengers while stabilizers in halogen-free poly-α-olefins do not serve this function. Likewise, ultraviolet inhibitors which are eminently suited for such cellulosic esters as cellulose triacetate, cellulose acetate butyrate and the like are not necessarily effective ultraviolet inhibitors for poly-α-olefins because of the inherently different nature of poly-α-olefins. Hence, it is highly unpredictable as to whether a given ultraviolet inhibitor compound will be effective in poly-α-olefin compositions.

At least as unpredictable is the determination of whether or not a given combination of two or more stabilizer compounds will synergize to produce a stabilizing effect in poly-α-olefins that is greater than the additive effect of the individual stabilizers. We know of no method whereby a combination of stabilizers can be predicted to be synergistic stabilizers for poly-α-olefin compositions short of actually testing the combination, even though the individual components comprising the combination may be well-known stabilizers for various polymers, resins or plastics, including poly-α-olefin compositions.

Apart from the fact that it is an unexpected technological discovery when two stabilizers are found that will synergize with each other in poly-α-olefin compositions, there are certain practical or commercial advantages that often times accompany the use of such a combination of stabilizers as distinguished from the use of a single stabilizer material or compound. For example, one of the stabilizers of the combination might be costly or difficult to acquire in commercial amounts while the other stabilizer of the combination might be relatively cheap and readily available. In such a situation it would be desirable to be able to substitute the cheaper stabilizer for a portion of the more expensive stabilizer, and still be able to obtain good stabilization through the synergism of the stabilizer combination. In addition, one of the stabilizers of a combination that synergizes with another stabilizer to produce improved resistance to deterioration by ultraviolet light might also serve as an effective stabilizer against odor formation, discoloration or other degradation due to high temperature processing methods or to uses of the poly-α-olefin composition at high temperatures. Thus, it is highly desirable in the poly-α-olefin art to have available synergistic combinations of two or more stabilizers.

It is an object of this invention to provide a new synergistic combination of stabilizers for poly-α-olefin compositions.

It is another object of this invention to provide novel polyethylene and polypropylene compositions containing a synergistic combination of compounds that improves the stability of the polyethylene and polypropylene compositions against deterioration resulting from exposure to sunlight or ultraviolet light.

It is also an object of this invention to provide novel poly-α-olefin compositions of improved stability in thin film form.

Other objects of the invention will be apparent from the description and claims that follow.

The present invention comprises poly-α-olefin compositions having incorporated therein a synergistic stabilizer combination comprising (1) a 4-alkoxy-2-hydroxybenzophenone, and (2) a zinc N,N-dialkyldithiocarbamate.

The 4-alkoxy-2-hydroxybenzophenone component of the present combination has the following formula

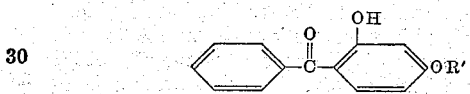

wherein R' is an alkyl group having 12 to 14 carbon atoms. Suitable 4-alkoxy-2-hydroxybenzophenone compounds are 4-dodecyloxy-2-hydroxybenzophenone, 4-tridecyloxy-2-hydroxybenzophenone and 4-tetradecyloxy-2-hydroxybenzophenone. Such compounds are described in Lappin and Tamblyn application U.S. Serial No. 694,906 filed November 7, 1957 now U.S. Pat. No. 2,861,053 as effective stabilizers in poly-α-olefins against deterioration from ultraviolet light. When a zinc salt of N,N-dialkyldithiocarbamate is combined with the described 4-alkoxy-2-hydroxybenzophenone, an improved resistance in poly-α-olefins against deterioration resulting from exposure to ultraviolet light results that is greater than the additive or aggregative stabilizing effect of these individual stabilizers. Such combinations are generally referred to as synergistic combinations.

The zinc N,N-dialkyldithiocarbamates used in the present synergistic combination have the following formula

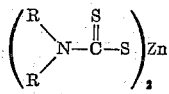

wherein R is a lower alkyl radical containing 1 to 8 carbon atoms. The preferred stabilizer has four carbons for the alkyl substituent, and more particularly, zinc N,N-di-n-butyldithiocarbamate, although other zinc N,N-aldialkyldithiocarbamates having such alkyl substituents as methyl, ethyl, propyl, isopropyl, isobutyl, amyl, hexyl etc., or admixtures thereof, can be employed in the subject stabilizer combination. Zinc N,N-dialkyldithiocarbamates are described in Tholstrup and Tamblyn application U.S. Serial No. 670,375 filed July 8, 1957 as effective heat stabilizers for poly-α-olefin compositions. Thus, the present combination of stabilizers not only lends to poly-α-olefin compositions improved resistance to ultraviolet light but also resistance to elevated temperatures.

The combination of 4-alkoxy-2-hydroxybenzophenone and zinc N,N-dialkyldithiocarbamates as described above can be used to stabilize a wide variety of poly-α-olefin compositions against deterioration resulting from exposure to ultraviolet light. Any of the normally solid polymers of α-monoolefinic aliphatic hydrocarbons containing 2 to 10 carbon atoms can be stabilized in accordance with the invention. The subject stabilizer combination is preferably used in polyethylene and polypropylene, and particularly in polyethylene, although such poly-alpha-olefins as poly 4-methylpentene-1, poly 3-methylbutene-1, poly 3,3-dimethyl-butene-1, poly pentene-1, and the like are included in the invention. Both the so-called "low density" and "high density" poly-alpha-olefin compositions can be stabilized in accordance with the invention. Reference is made to Fawcett et al. U.S. Patent No. 2,153,553, granted April 11, 1939, and to applications Coover U.S. Serial No. 559,536, filed January 17, 1956, and Coover et al. U.S. Serial No. 724,904, filed March 31, 1958, with regard to the preparation of various poly-alpha-olefin compositions that can be stabilized against ultraviolet deterioration with the subject stabilizer combination. The subject stabilizer combination can be used as an ultraviolet inhibitor for the more common solid resinous poly-alpha-olefin compositions having average molecular weights of at least 15,000 and more usually at least 20,000, as well as the so-called poly-alpha-olefin waves having lower molecular weights, usually 3,000 to 12,000.

The amount of the combination of the 4-alkoxy-2-hydroxybenzophenone and the zinc salt of N,N-dialkyldithiocarbamate employed in poly-alpha-olefin compositions in accordance with the invention can be widely varied, the stabilizing amount of this combination usually varying with the particular use to which the poly-alpha-olefin is to be put. Concentrations of the combination of at least 0.001% are used, with concentrations of 0.001% to 10% being generally used, and with concentrations of 0.005% to 5% being preferably used, the concentration being based on the weight of the poly-alpha-olefin. The weight ratios of the two stabilizers comprising the subject synergistic combination likewise can be varied. We prefer to utilize the combination of the subject two stabilizers at a weight ratio of the zinc salt of N,N-dialkyldithiocarbamate to the 4-alkoxy-2-hydroxybenzophenone ranging from 1/30 to 30/1, and preferably 1/10 to 10/1.

The stabilizer combination of the invention can be incorporated or blended into poly-α-olefin compositions by any of the conventional methods used for blending such materials into resins or plastics. Typical of such methods that can be suitably employed include milling on heated rolls, deposition from solvents and dry-blending. The stabilizers of the invention can be incorporated separately or together into the poly-α-olefin composition.

The stabilizer combination of the present invention lends to poly-α-olefin compositions improved stability, and more specifically, improved stability against deterioration resulting from exposure to sunlight or ultraviolet light. The zinc salt of N,N-dialkylthiocarbamate of the subject synergistic combination also lends to poly-α-olefin compositions a substantial thermal stability. Thus, poly-α-olefins stabilized in accordance with the invention have an extended life expectancy and can be used more effectively than unstabilized poly-α-olefins for a wide diversity of uses. Poly-α-olefins stabilized in accordance with the invention can be cast, extruded, rolled or molded into sheets, rods, tubes, piping, filaments and other shaped articles, including the widely used films of the polymer about 0.5 to 100 mils in thickness. The present composition can be used for coating paper, wire, metal foil, glass fiber fabrics, cloth, including synthetic and natural textiles, and other such materials. Likewise, small amounts of other additives such as are commonly added to poly-α-olefins for specific uses are not deleterious to the effectiveness of the present synergistic combination. For example, the present synergistic combination can be used to stabilize a typical polyethylene composition used for coating paper containing a small amount of a terpene or pinene resin such as about 5% "Piccolyte S–115–L" (Pennsylvania Industrial Chemical Corporation). Likewise, small amounts of other inhibitors or stabilizers can be used in the present poly-α-olefin compositions if desired.

The invention is illustrated by the following examples of preferred embodiments thereof.

EXAMPLE 1

Polyethylene samples containing .5% by weight of zinc N,N-di-n-butyldithiocarbamate plus 1% by weight of 4-dodecyloxy-2-hydroxybenzophenone, as well as these two stabilizers individually and a control containing no stabilizer additive for comparative purposes, were subjected to a weathering test. The various samples were prepared by incorporating the various additives into polyethylene having an average molecular weight of about 30,000 and a density of 0.918 by milling on heated rollers in accordance with usual practice. Thereafter the polyethylene was compression molded into films 5 mils in thickness and cut into test strips 2.5 x 0.5 inches in size. The prepared samples were exposed in an Atlas Twin-Arc Weather-Ometer as described in Anal. Chem., 25, 460(1953) that was modified by the addition of 10 Westinghouse 20 watt fluorescent sunlamps. Exposure damage to the samples of the poly-α-olefin composition were evaluated and compared by the exposure time in hours required for 50% loss of elongation as measured on an Instron Tensile Tester at a rate of stretch of 2,000% per minute. The samples were conditioned for one week at 73° F. at a relative humidity of 50%. The results of the tests are summarized by the data set out in the table below.

Table

| Additive | Exposure Time in Hours Required for 50% Loss of Original Elongation |
|---|---|
| (1) None | 120 |
| (2) .5% Zinc N,N-di-n-butyldithiocarbamate | 400 |
| (3) 1% 4-Dodecyloxy-2-hydroxybenzophenone | 700 |
| (4) .5% Zinc N,N-di-n-butyldithiocarbamate + 1% 4-Dodecyloxy-2-hydroxybenzophenone | 1,500 |

As can be observed from the data set out in the above table, the combination of zinc N,N-di-n-butyldithiocarbamate and dodecyloxy-2-hydroxybenzophenone is a stabilizer combination that has a stabilizing effect greater than the additive or aggregative effect of the individual stabilizers with respect to reducing deterioration of the poly-α-olefin composition by ultraviolet light. In a similar manner a combination of .5% by weight of zinc N,N-di-n-butyldithiocarbamate plus 1% by weight of 4-tetradecyloxy-2-hydroxybenzophenone in the polyethylene is a synergistic stabilizer combination therefor.

EXAMPLE 2

Polypropylene having an average molecular weight of about 110,000 and a density of 0.917 containing .5% by weight of such zinc salts of N,N-di-lower alkyldithiocarbamates as zinc N,N-diethyldithiocarbamate and zinc N,N-diisobutyldithiocarbamate in combination with 1% by weight of such 4-alkoxy-2-hydroxybenzophenones as 4-dodecyloxy-2-hydroxybenzophenone and 4-tetradecyloxy-2-hydroxybenzophenone, when prepared in test samples and tested as described in Example 1, also show a synergistic effect in stabilizing the polypropylene against deterioration resulting from exposure to ultraviolet light.

The present invention thus provides novel poly-α-olefin compositions having improved stability against deterioration resulting from exposure to ultraviolet light, and particularly it provides novel synergistic stabilizer combinations for poly-α-olefin compositions.

Although the invention has been described in considerable detail with reference to preferred embodiments thereof, it will be understod that variations and modifications can be effected within the spirit and scope of the invention as described hereinabove and as defined by the appended claims.

We claim:

1. A solid poly-α-olefin composition comprising a solid poly-α-olefin prepared from an α-monoolefinic aliphatic hydrocarbon having 2 to 10 carbon atoms containing .001% to 10% by weight based on said poly-α-olefin of a stabilizer combination comprising a zinc N,N-dialkyldithiocarbamate having the formula

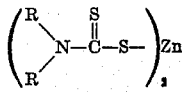

wherein R is an alkyl group containing 1 to 8 carbon atoms and a 4-alkoxy-2-hydroxybenzophenone having the formula

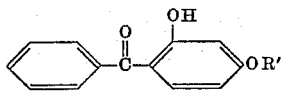

wherein R' is an alkyl group containing 12 to 14 carbon atoms, the weight ratio of zinc N,N-dialkyldithiocarbamate to said 4-alkoxy-2-hydroxybenzophenone being in the range of 1/30 to 30/1.

2. A solid poly-α-olefin composition comprising a solid poly-α-olefin selected from the group consisting of polyethylene and poly propylene containing .001% to 10% by weight based on said poly-α-olefin of a stabilizer combination comprising a zinc N,N-dialkyldithiocarbamate having the formula

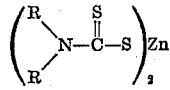

wherein R is an alkyl group containing 1 to 8 carbon atoms and a 4-alkoxy-2-hydroxybenzophenone selected from the group consisting of 4-dodecyloxy-2-hydroxybenzophenone and 4-tetradecyloxy-2-hydroxybenzophenone, the weight ratio of said zinc N,N-dialkyldithiocarbamate to said 4-alkoxy-2-hydroxybenzophenone being in the range of 1/30 to 30/1.

3. A solid poly-α-olefin composition comprising a solid poly-α-olefin selected from the group consisting of polyethylene and polypropylene containing .001% to 10% by weight based on said poly-α-olefin of a stabilizer combination comprising zinc N,N-di-n-butyldithiocarbamate and a 4-alkoxy-2-hydroxybenzophenone selected from the group consisting of 4-dodecyloxy-2-hydroxybenzophenone and 4-tetradecyloxy-2-hydroxybenzophenone, the weight ratio of said zinc N,N-di-n-butyldithiocarbamate to said 4-alkoxy-2-hydrobenzophenone being in the range of 1/30 to 30/1.

4. A solid polyethylene composition comprising solid polyethylene containing .005% to 5% by weight based on said polyethylene of a stabilizer combination comprising zinc N,N-di-n-butyldithiocarbamate and 4-dodecyloxy-2-hydroxybenzophenone, the weight ratio of said zinc N,N-di-n-butyldithiocarbamate to said 4-dodecyloxy-2-hydroxybenzophenone being in the range of 1/10 to 10/1.

5. A solid poly-α-olefin composition comprising a solid poly-α-olefin selected from the group consisting of polyethylene and polypropylene in film form 0.5 to 100 mils in thickness containing .005% to 5% by weight based on said poly-α-olefin of a stabilizer combination comprising zinc N,N-di-n-butyldithiocarbamate and a 4-alkoxy-2-hydroxybenzophenone selected from the group consisting of 4-dodecyloxy-2-hydroxybenzophenone and 4-tetradecyloxy-2-hydroxybenzophenone, the weight ratio of said zinc N,N-di-n-butyldithiocarbamate to said 4-alkoxy-2-hydroxybenzophenone being in the range of 1/10 to 10/1.

6. A solid polyethylene composition comprising solid polyethylene containing .005% to 5% by weight based on said polyethylene of a stabilizer combination comprising zinc N,N-di-n-butyldithiocarbamate and 4-tetradecyloxy-2-hydroxybenzophenone, the weight ratio of said zinc N,N-di-n-butyldithiocarbamate to said 4-tetradecyloxy-2-hydroxybenzophenone being in the range of 1/10 to 10/1.

7. A solid polypropylene composition comprising solid polypropylene containing .005% to 5% by weight based on said polypropylene of a stabilizer combination comprising zinc N,N-di-n-butyldithiocarbamate and 4-dodecyloxy-2-hydroxybenzophenone, the weight ratio of said zinc N,N-di-n-butyldithiocarbamate to said 4-dodecyloxy-2-hydroxybenzophenone being in the range of 1/10 to 10/1.

8. A solid polypropylene composition comprising solid polypropylene containing .005% to 5% by weight based on said polypropylene of a stabilizer combination comprising zinc N,N-di-n-butyldithiocarbamate and 4-tetradecyloxy-2-hydroxybenzophenone, the weight ratio of said zinc N,N,-di-n-butyldithiocarbamate to said 4-tetradecyloxy-2-hydroxybenzophenone being in the range of 1/10 to 10/1.

References Cited in the file of this patent

UNITED STATES PATENTS

| | | |
|---|---|---|
| 2,387,518 | Lightbown et al. | Oct. 23, 1945 |
| 2,582,510 | Stiratelli | Jan. 15, 1952 |
| 2,861,053 | Lappin et al. | Nov. 18, 1958 |

FOREIGN PATENTS

| | | |
|---|---|---|
| 154,315 | Australia | Nov. 25, 1953 |
| 779,807 | Great Britain | July 24, 1957 |